Patented Feb. 11, 1936

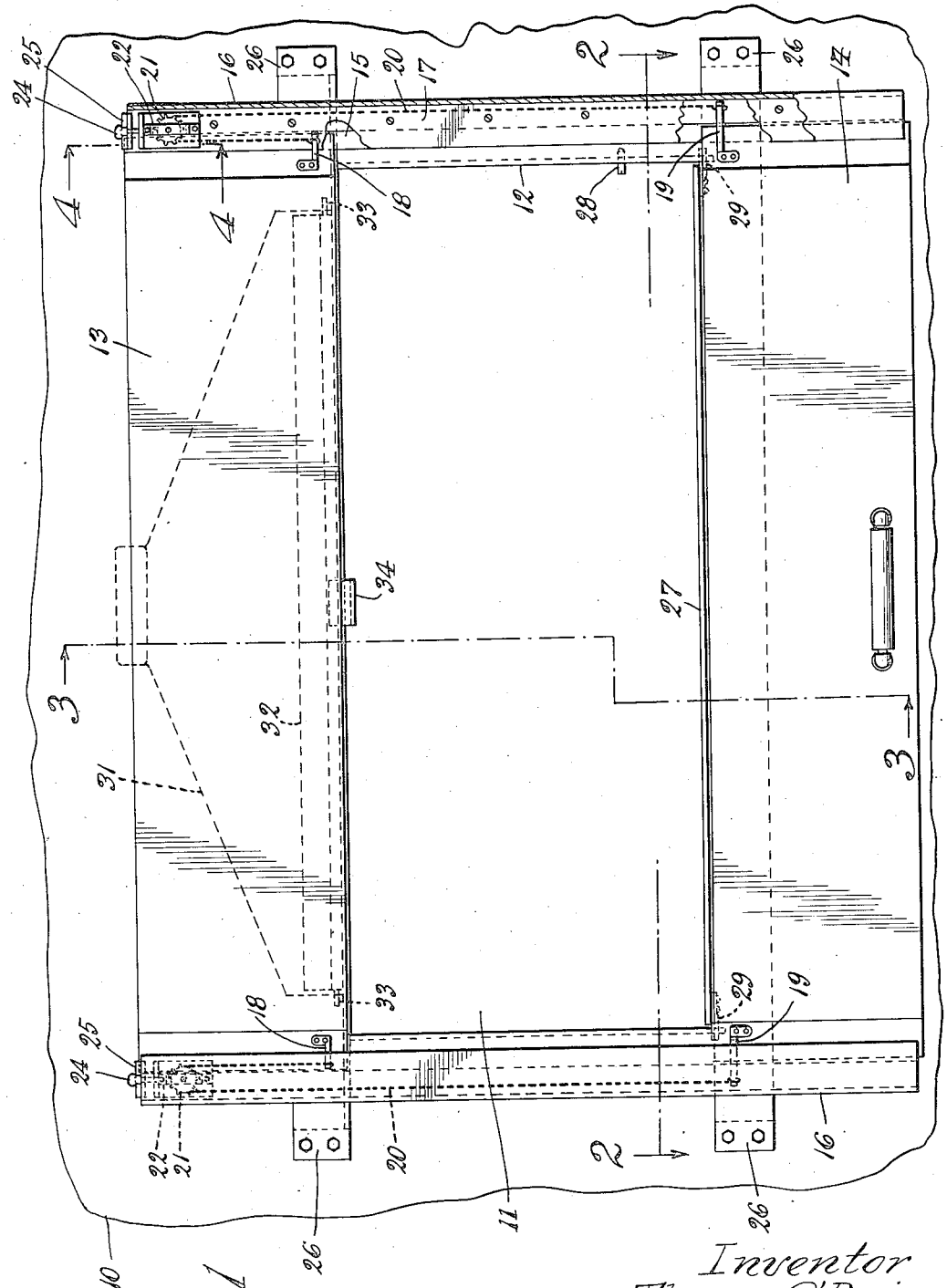

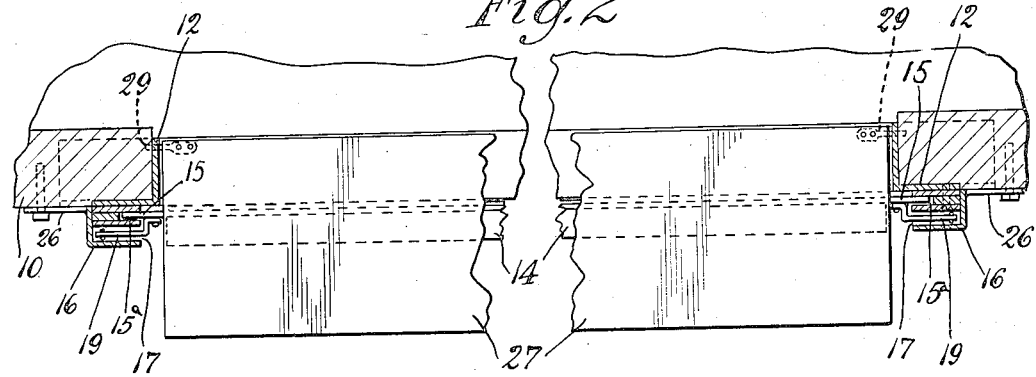
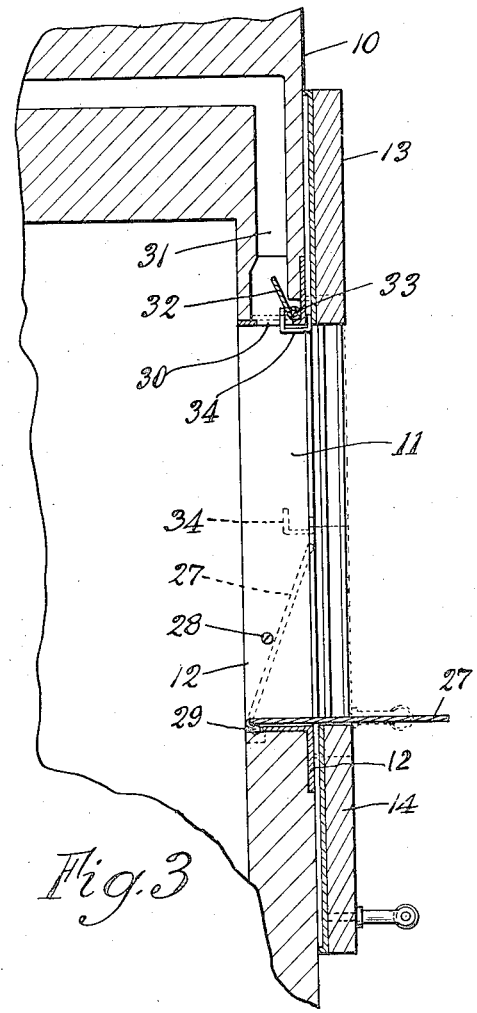
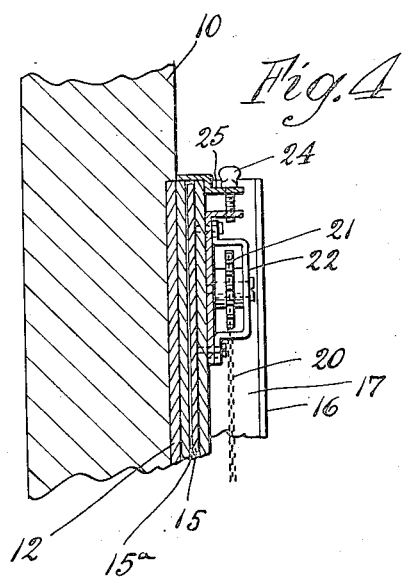

2,030,223

UNITED STATES PATENT OFFICE 2,030,223

OVEN DOOR CONSTRUCTION

Thomas O'Brien, Chicago, Ill., assignor to Middleby-Marshall Oven Co., Chicago, Ill., a corporation of Illinois Application April 4, 1935, Serial No. 14,555

8 Claims. (Cl. 107—65)

This invention relates to improvements in oven door construction.

One object of the invention is to provide an improved horizontally divided door structure for bake ovens, each section of which counterbalances the other to provide an easily operated closure, which in turn operates members located interiorly of the oven.

Another object of the invention is to provide a divided door, the lower section of which operates a peel rest which is pivoted inwardly of the door sections and which, when the door is opened, moves outwardly to horizontal position to provide a shelf for pans in loading or unloading the oven and forms a shield which prevents the entrance of refuse between the door and the side wall of the oven, the peel rest being moved inwardly by the lower door section when the door is closed.

A further object of the invention is to provide a divided door structure, the upper section of which, when the door is opened, is arranged to open a damper or valve of an eduction flue through which hot gases are drawn which otherwise tend to flow through the door opening into the face of the baker.

Other objects relate to various features of construction and arrangement of parts which will be apparent from a consideration of the following specification and accompanying drawings, wherein:

Figure 1 is a broken front elevation of a furnace illustrating an embodiment of my improvements in position thereon.

Figure 2 is a horizontal section taken on line 2—2 of Figure 1.

Figure 3 is a vertical section taken on line 3—3 of Figure 1.

Figure 4 is an enlarged vertical section taken on line 4—4 of Figure 1.

In the drawings 10 indicates generally the front wall of a conventional bake oven having a loading door-opening 11. The opening 11 is defined by a frame 12 of angular cross section. Upper and lower door sections 13 and 14 respectively are mounted on the exterior wall of the oven. Any suitable mounting means for the doors may be provided, but in the drawings the door sections are shown as being provided with end extensions 15 which project into channels 15a formed in track or guide members 16, to provide a seal against the escape of hot gases from the oven when the door sections are closed.

A second channel 17 is provided in each of the track structures into which project arms 18 and 19 from the upper and lower door sections, respectively. A chain 20 is secured to each pair of arms 18 and passes over a sprocket 21 whereby when the lower door section 14 is raised or lowered the upper door section 13 will be moved in the opposite direction. When the lower door section 14 is raised from the position shown in Figure 1, it will abut the upper door section 13 midway of the door opening. The door sections being of equal weight, one counterbalances the other.

Each of the sprockets 21 is carried by a slidable hanger member 22 which may be raised or lowered by means of a thumb screw 24 which passes through a stationary horizontal bracket 25. Thus by adjusting the hangers 22 upwardly or downwardly the door sections can be aligned horizontally to form a tight seal at their meeting edges.

As shown in the drawings, the tracks may be supported by bolting the ears 26 thereof to the front wall of the oven.

A peel rest 27, which is in the form of a metal plate, is provided with studs 29 which extend into openings formed in the frame 12, to provide a pivot which enables the peel rest to be swung from the dotted line position of Figure 3 to the full line position. Stops 28 are also secured to the frame 12 to limit the inward swinging movement of the member 27.

The peel rest is of sufficient width from front to rear to extend outwardly of the oven when in the horizontal position, to thus provide an ample shelf upon which the baker may place pans preparatory to loading the oven. This peel rest construction is of particular advantage where the oven wall is relatively thin since in that instance the base of the door-opening affords but little area upon which the pans can be placed.

It will be noted that the peel rest also forms a guard which prevents the accumulation of dough or other refuse between the lower door section 14 and the oven wall. When the lower door section is raised from the position shown in Figure 3, the peel rest 27 is moved thereby to the dotted line position. When the door is again opened, the peel rest automatically gravitates to the full line position.

The peel rest thus is enclosed within the oven when the oven is closed, but moves automatically to operative position when the door is opened.

The horizontal upper portion of the frame 12 is provided with an exhaust port 30 which extends substantially the full width of the door opening. Extending from the opening 30 is a flue 31 which preferably leads to the chimney of the oven, the chimney not being shown. A valve or damper 32 is pivotally supported at 33 within the flue 31 and is adapted to drop by gravity to horizontal position to close the opening 30 when the upper door section 13 is lowered from the position shown in Figure 3.

When the door of a bake oven is open, hot gases puff forth therefrom into the baker's face, which is not only uncomfortable and annoying, but is considered to be detrimental to his health. With the present arrangement when the door is opened an arm 34, which is carried by the upper door section 13, lifts the valve 32 to open position and permits a large portion of the hot gases to escape through the duct 31 which, if connected to the chimney, becomes an eduction flue and tends to draw the gases through the port 30.

It will thus be seen that upon moving the door section to open position, the lower section 14 permits the peel rest 27 to gravitate to horizontal position, while the upper section 13 lifts the valve and permits the hot gases to escape through the flue 31. When the door sections are moved to closed position, the valve 32 gravitates to closed position, while the peel rest is moved to the inclined position within the door opening, and thus does not form an obstruction on the exterior of the oven when the door is closed.

While I have shown and described an embodiment of my improvements for the purpose of illustration, I do not wish to be restricted specifically thereto except as so limited by the appended claims.

I claim:

1. The combination with a bake oven having a loading door-opening in a wall thereof, of a door mounted on the oven wall for vertical movement to open or close said opening, and a peel rest pivoted to the oven structure within said opening and arranged for movement by gravity to horizontal position when said door is moved to open position.

2. The combination with a bake oven having a loading door-opening in a wall thereof, of a door mounted on the exterior of the oven wall for vertical movement to open or close said opening, and a peel rest pivoted at its lower end to the oven structure and arranged to rest in inclined position against said door when the latter is closed and to swing by gravity to horizontal position and project through said opening when said door is opened.

3. The combination with a bake oven having a loading door-opening in a wall thereof, of a door for said opening mounted on the exterior of said wall, mounting means for said door whereby the same can be lowered beneath the lower end of said opening, and a peel rest pivotally mounted within the door-opening and arranged to swing by gravity to horizontal position and extend through said opening and over the upper end of said door when the latter is lowered and to be returned by said door to the original position within said opening when said door is closed.

4. The combination with a bake oven having a door-opening in one wall thereof, of a vertically movable door for said opening positioned on the exterior of said wall, a flue extending from adjacent the upper portion of said opening for diverting hot gases tending to flow through said opening when the door is open, a closure member for said flue movable by gravity to closed position, and means operable by said door within said door opening for moving said closure member to open position when said door is opened.

5. The combination with a bake oven having a door-opening in one wall thereof, of a door for said opening comprising two counterbalanced sections arranged to move simultaneously in opposite directions in opening and closing the same, a flue extending from adjacent the upper portion of said opening for diverting hot gases tending to flow through said opening when the door is open, a closure member for said flue movable by gravity to closed position, and a member carried by said upper door section for engaging and moving said closure member to open position when said door is opened.

6. The combination with a bake oven having a door-opening in one wall thereof, of a door for said opening comprising upper and lower counterbalanced vertically movable sections, a flue extending from adjacent the upper portion of the door-opening for diverting hot gases tending to flow through said opening when the door is open, a pivoted closure member for said flue normally closing the same, and a member extending inwardly from the upper door section into vertical alignment with said closure member and arranged to move said closure member to open position simultaneously with the movement of said door to open position.

7. The combination with a bake oven having a door-opening in one wall thereof, of a member pivotally mounted adjacent the base of said opening, a second pivotally mounted member adjacent the top of said door opening, and a pair of vertically movable door sections for said opening each arranged for operating one of said pivotally mounted members as said sections are moved to and from open position.

8. The combination with a bake oven having a frame defining a door-opening in one wall thereof, of a pivotally mounted member supported by said frame inwardly of the outer face of said wall and arranged to be moved by gravity to horizontal position, and a vertically operable door on the outer face of said wall arranged to elevate said pivoted member as said door is elevated.

THOMAS O'BRIEN.